United States Patent Office 3,182,736
Patented May 11, 1965

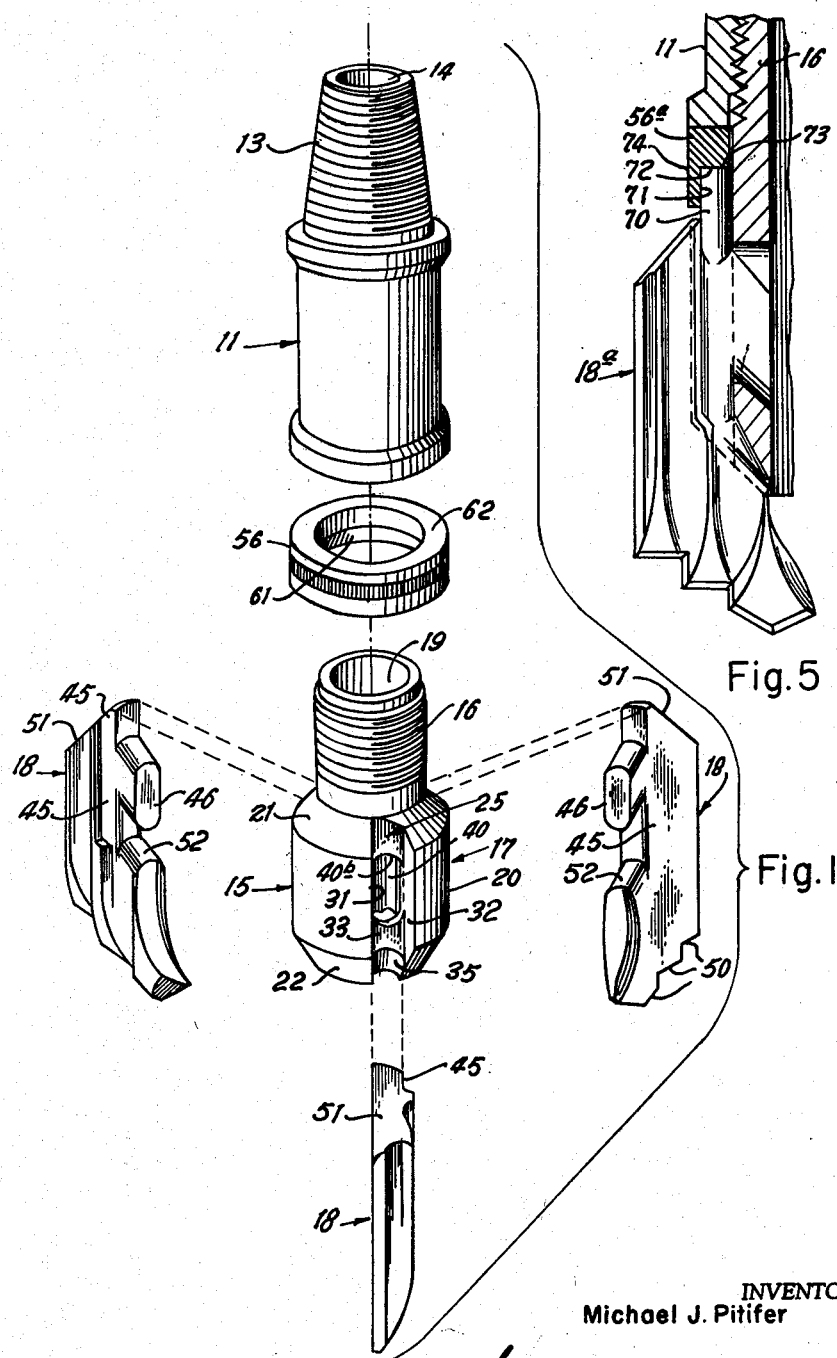

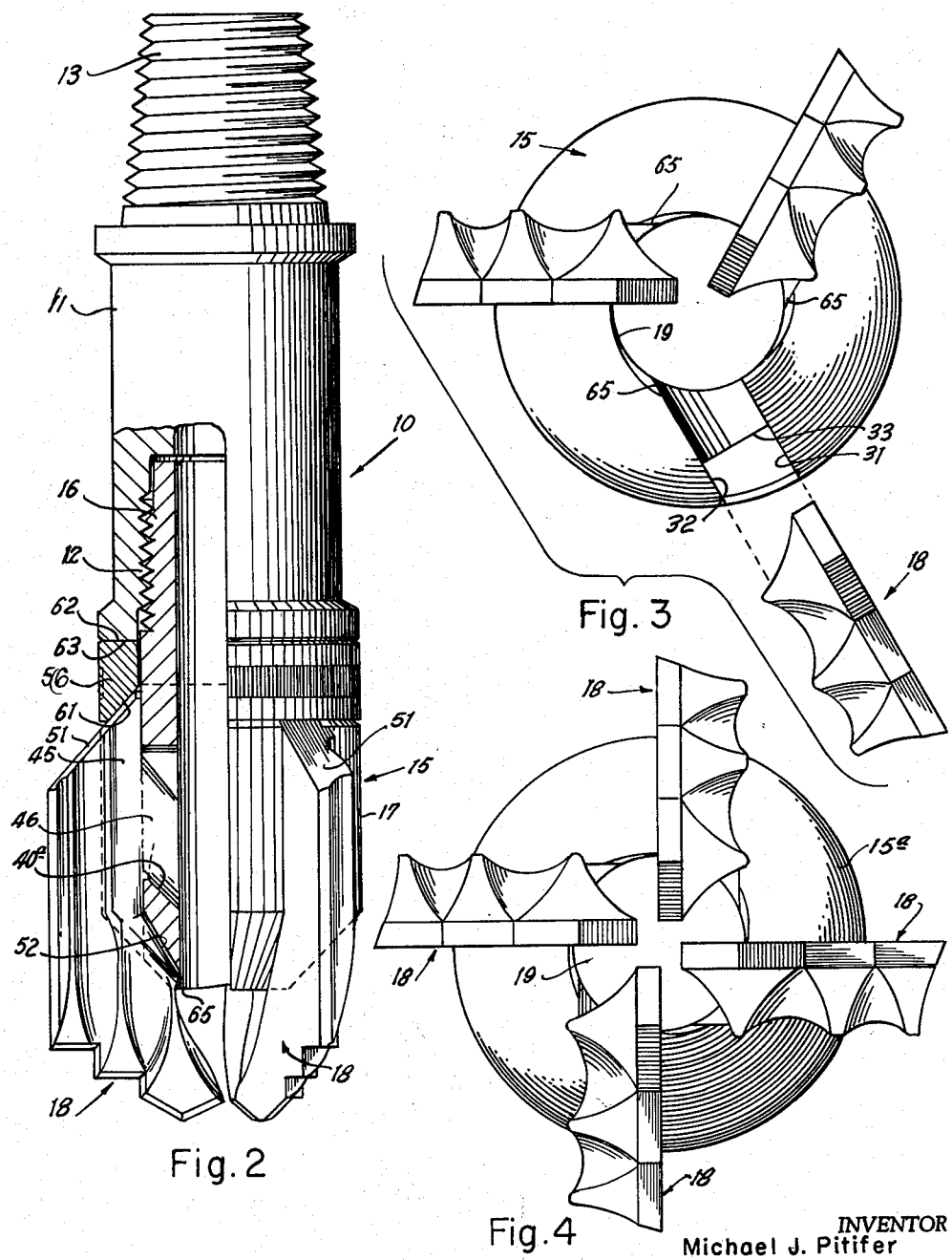

3,182,736
DRILLING BITS
Michael J. Pitifer, Lubbock, Tex., assignor of one-fourth each to Thomas H. Arnold and Lee R. Miller, Lubbock, Tex., and Ole K. Olsen, Garland, Tex.
Filed Nov. 28, 1962, Ser. No. 240,561
8 Claims. (Cl. 175—413)

This invention relates to drilling bits, and more particularly, to drilling bits with a plurality of removable and replaceable cutter blades.

One object of this invention is to provide a new and improved drilling bit.

Another object is to provide a new and improved form of rotary drilling bit with removable and replaceable cutter blades which will be kept tightly secured on the bit during use.

A further object is to provide a drilling bit equipped with removable and replaceable cutter blades which will permit the speedy and efficient replacement of the cutter blades without requiring the disassembly of the other parts of the bit.

A still further object is to provide a rotary type drilling bit including a replaceable drill body having a plurality of removable cutter blades supported thereon and a collar means cooperable with the drill body for locking the blades in place whereby the bit is readily adaptable for drilling holes of different diameters by replacing on the drill body head bit cutter blades of a size providing for the desired size of the hole to be drilled.

Still another object is to provide a rotary type drilling bit assembly equipped with removable cutter blades which may be readily adapted to drilling holes of different diameters while employing the same body for supporting the cutter blades.

A still further object is to provide a rotary drilling bit having a bit body and a drill head with slots therein for receiving and supporting a plurality of cutter blades against longitudinal movement on the drill head and a collar means cooperable with the bit body and the drill head for locking the blades in place and which may be readily adapted for drilling holes of different diameters by replacing the drill bit cutter blades with blades which correspond in size to the desired size of the hole to be drilled; or, wherein the diameter of the hole being drilled may also be varied by the use of drill bit bodies and locking collar means of different sizes with suitable blades of one size and shape to provide for laterally disposing the blades at the proper positions to provide the desired hole diameter.

A still further object is to provide a new and improved multi-blade rotary bit structure including a drill bit body having radially projecting blades mounted externally thereon at circumferentially spaced points thereabout and supported thereon by means of lugs on the blades which extend into recesses in the drill bit body head wherein the lugs and recesses are cooperable to prevent twisting of the lower ends or upward movement of the blades during drilling operations.

Additional objects and advantages of the invention will be readily apparent from the reading of the following description of a device constructed in accordance with the invention, and reference to the accompanying drawings thereof, wherein:

FIGURE 1 is an exploded view in perspective of the drilling bit of the invention;

FIGURE 2 is a view, partly in elevation and partly in section, of the drilling bit of FIGURE 1 in assembled form;

FIGURE 3 is a partially exploded, bottom end view of the drilling bit, showing one of the blades detached therefrom;

FIGURE 4 is a bottom end view of a modified form of the drilling bit equipped with four blades; and FIGURE 5 is a fragmentary sectional view of a further modified form of the bit provided with modified blades and blade locking means.

Referring particularly to FIGURES 1 to 3 of the drawings, the bit 10 includes a body collar member 11 having an internally threaded socket 12 at one end and a tapered and externally threaded pin 13 at the other end for connecting the bit to a drill stem. The body collar member 11 is provided with a flow passage 14 extending axially through the body for permitting the flow of drilling muds or flushing fluids through the bit.

A drill bit body head member 15 is received in the socket 12 of the bit body collar member and connected thereto by an externally threaded pin 16 formed at the upper end of the drill bit body head member and which is adapted to be threaded into the socket 12 of the collar. The head member includes an enlarged blade carrying head portion 17 upon which are removably mounted a plurality of cutter blades 18 which form the cutting elements of the bit. A longitudinal flow passage 19 extends through the bit head member and communicates with the flow passage 14 through the bit body collar member when the head member is assembled with the collar, thus providing a through longitudinal axial flow passage through the bit.

The blade carrying head portion 17 of the body head member is formed with a cylindrical external surface 20 of larger diameter than the pin 16, provided at its upper and lower ends with bevelled shoulders in the form of substantially frusto-conical surfaces 21 and 22, respectively.

A plurality of elongate blade receiving recesses or grooves 25 are formed in the peripheral surface of the blade carrying head portion 17 of the head member for receiving and supporting the blades of the bit therein. Each of the blade-receiving grooves extends longitudinally throughout the length of the enlarged portion 17 and is formed with parallel planar side walls 31 and 32 and a planar base or bottom surface 33 extending longitudinally of the head portion parallel to the longitudinal axis of the head member and perpendicular to the side walls 31 and 32.

In each groove, the side wall 31 extends radially coplanar with the longitudinal axis of the head member as shown in FIGURES 1 and 3. At its lower end, each of the grooves 25 is formed with a concave inwardly inclined or tapered surface 35 which at its upper end intersects the base surfaces 33 and merges with the lower ends of the side walls 31 and 32 of the groove. Each groove 25 is also provided with a locking recess or lug cavity 40 which is formed intermediate the ends of the base 33 of the groove by drilling, milling, undercutting, or any other suitable manner, and which at its lower end extends downwardly and inwardly of the drill head member as clearly shown in FIGURE 2 to provide a locking shoulder or surface 40a for a purpose to be hereinafter more fully described. The upper end 40b of the cavity or recess 40 extends radially inwardly substantially perpendicular to the axis of the head member.

The blades 18 of the bit, which are receivable in the grooves 25, are each provided with an inner edge portion 45 of a width equal to that of the groove in which it is adapted to lie and shaped in conformity with the groove to provide for a snug fit of the inner edge portion of the blade in the groove. A locking lug 46 is also formed on and projects from the inner edge portion 45 of each blade, and this lug is adapted to be received in the lug cavity 40 when the blade is mounted in the groove 25. Since the locking lug extends downwardly of the inner edge of the blade inwardly and downwardly inclined and engages the surface 40a, the blade is supported on the drill bit head member and held by engaging the locking surface 40a against downward movement relative to said head member where the lug is positioned in the lug cavity or recess. The upper extremity of the lug cavity may also be formed to extend downwardly and inwardly of the drill head to provide a snug fit for the locking lug. In the form of the bit illustrated in FIGURES 1 to 3, however, the upper wall 40b of each lug cavity extends radially inwardly of the drill head member instead of downwardly so as to enlarge the cavity at its upper end and make it easier to insert the lug 46 in the cavity when mounting the blade on the drill head.

The locking ring 56 is sleeved about and slidable on the lower unthreaded portion of the pin 16 and is formed with an internal annular undercut bevelled surface 61 at its lower end which conforms to the upper bevelled frustoconical surface 21 of the enlarged head portion 17 of the head member. In assembling the bit, when the drill body head member is connected into the socket end of the bit body collar member, the upper end face 62 of the locking ring is adapted to be engaged by the lower end face 63 of the collar member, while the undercut bevelled surface 61 at the lower end of the ring is seated on the upwardly facing bevelled locking surfaces 51 of the several drill bit blades and the frusto-conical upper surface 21 of the enlarged head portion 17 of the head member. This engagement of the undercut shoulder 61 of the ring with the upper bevelled locking surfaces 51 of the blades 18 tends to cam the blades downwardy and inwardy on the drill body head member. It will thus be seen that the blades 18 are held locked in position on the drill body head member against outward movement, and that they cannot readily be removed without unthreading the drill body head member from the socket of the bit body collar member to loosen the locking ring and allow the blades to be lifted to remove the lugs from the cavities 40 and to remove the blades out of the grooves 25. The locking ring must be loosened sufficiently to allow the lugs 46 of the blades to clear the lug cavities 40, to permit such removal of the blades from the head member.

It will thus be seen that the blades of the bit, when seated in the grooves 25, are supported on the drill head member by the engagement of the lugs 46 in the cavities 40 and that the blades are locked in place on the drill body head member by the locking ring 56 and the body collar member 11 when the bit is assembled.

When it becomes necessary to replace the blades, they may be speedily and efficiently removed and replaced without disassembling the entire bit, since it is only required that the drill body head member be partly unscrewed from the socket of the bit body collar member to loosen the locking ring sufficiently to allow removal of the blades.

Each cutter blade 18 is provided with suitable cutting teeth 50 at its sides and lower end. The upper end of each blade is bevelled outwardly and downwardly to provide a locking surface 51 at its upper end, and has an inwardly and downwardly extending driving shoulder 52 which is convex in shape and is adapted to snugly fit the inwardly inclined concave surface 35 at the lower end of the blade receiving recess 25, as clearly shown in FIGURE 2 whereby downward force may be applied by the head member 17 to the blade. When the blade is mounted on the drill body head member and seated in the groove 25, the upper bevelled locking surface 51 of the blade lies substantially co-planar with the upper bevelled frustoconical surface 21 of the enlarged head portion 17 and is adapted to be engaged by a locking ring 56, by means of which the blade is held in place on said head member.

It will also be seen that when a blade is seated in a groove 25 and locked in place on the head member, the engagement of the inwardly and downwardly inclined convex shoulder surface 52 in the inwardly and downwardly inclined concave portion 35 of the slot or groove 25 prevents the lower end of the blade from being twisted during drilling operations, in which, at times, the bit may be rotated at a rate of more than one hundred revolutions per minute while several thousand pounds of weight are applied to the bit by the drill stem or drill pipe. A very strong multi-bladed bit structure is therefore provided which will keep the blades tightly secured on the bit during drilling, the thrust of weight transmitted through the drill stem to the bit only causes the locking ring to more tightly cam the blades inwardly against the drill body head member, and to lock the blades more securely in place in the grooves 25.

It is believed readily apparent that blades 18 having different lateral dimensions may be mounted on the head member 15 for drilling holes of different diameters, as long as the inner edge portions of all the blades are the same and will fit the groove or recess 25 in the head member and be confined thereon by the locking ring 56.

It will also be apparent that the same size and type of blade may be used for drilling different diameter holes, since it is apparent that the drill head member and collar member may be replaced with a drill head member and collar member which when the blades are mounted thereon supports the blades in position to drill the desired size. The same blades which were mounted on the first drill head may be remounted on the substitute drill head member. Thus, the invention provides a drill bit structure by means of which different sizes of holes may be drilled by changing the blades or the head member and collar member and locking ring when it is desired that holes of different diameters are to be drilled.

While a three-bladed bit is illustrated in FIGURES 1 through 3, it is to be understood, of course, that any desired number of blades may be provided. The arrangement of blades in a four-bladed modification of the bit is illustrated in FIGURE 4, showing the blades 18 equally spaced about the periphery of the drill head 15a. Irrespective of the number of blades, one wall of the blade-receiving grooves of the bit head member and therefore one side of each blade on the bit is always disposed radially and coplanar with the axis of the bit.

A further modified form of the bit showing a different type of blade and locking ring is illustrated in FIGURE 5. In this form, the blade 18a is provided at its upper end with a cylindrical lug or projection 70 which extends upwardly from the inner edge portion of the blade and is adapted to be received in an internal annular groove 71 formed in the lower end of the locking ring 56a. When the bit is assembled, the downward facing shoulder 72 forming the bottom of the groove 71 of the locking ring is forced into abutting engagement with the thrust face 73 at the upper end of the lug on the blade to absorb the substantial upward thrust of the blade. The cylindrical annular flange 74 of the locking ring engages the outer surface of the lug or projection 70 of the blade to prevent outward movement of the blade with respect to the drill head member. The blades therefore are held locked on the drill head by the locking ring 56a.

It will thus be seen that a rotary drilling bit is disclosed herein which is provided with removable and replaceable cutter blades, whereby the blades are tightly secured on the bit head member during use but may be quickly and easily replaced when damaged or worn.

It will further be seen that the drilling bit disclosed herein is equipped with a plurality of identical blade members which may be quickly replaced when necessary, the provision of the identical blade members permitting economical fabrication of the blade members, reducing the cost thereof, and providing for bits having a variety of numbers of blades and blade arrangements thereon.

It will further be seen that a rotary type drilling bit assembly is disclosed herein which is provided with removable cutter blades and which may be readily adapted to drilling holes of different diameters by changing cutter blades or the drill bit head members, collar member and locking ring.

The foregoing description of the invention is explanatory only, and changes in the details of the construction illustrated may be made by those skilled in the art, within the scope of the appended claims, without departing from the spirit of the invention.

What is claimed and desired to be secured by Letters Patent:

1. A drill bit including: a drill body head member; said head member having a plurality of longitudinally extending grooves in its exterior surface, each groove having formed intermediate the ends thereof an elongate locking recess extending inwardly of the head member from the bottom of the groove and having an inwardly and downwardly inclined locking surface at its lower end; a detachable blade removably mounted in each of said grooves of said head member, each of said blades having an inwardly and downwardly projecting lug formed on the inner surface thereof disposed within the locking recess in the one of the grooves of the head member in which the blade is mounted with the lower surface of the lug engaging the locking surface at the lower end of the recess in said groove; and means carried by said head member and engaging said blades for locking and retaining said blades in position on said head member.

2. A drill bit including: a head member having an enlarged cylindrical lower portion and an externally threaded upper portion, said enlarged portion of said head member having a plurality of circumferentially spaced longitudinally extending grooves formed in the exterior thereof, said head having radially extending locking recesses intermediate the ends of said grooves and extending inwardly of the head from the bottom of said grooves, said recesses each having an inwardly and downwardly inclined locking surface at their lower ends; a plurality of detachable drilling bit blade members each having an inner edge portion fitting the grooves of said head member and having cutting edges at its lower end, each of said blade members having an inwardly and downwardly projecting locking lug formed on the inner edge thereof disposed within the recess intermediate the ends of the grooves of said head member with the lower surface of the lug engaging the locking surface of the recess; a body collar member threaded onto the externally threaded portion of said head member; and a locking ring disposed between said collar member and said enlarged portion of said head member and engaging the upper end portions of each of said blade members to hold said blade members with the lugs engaged in the recesses in the grooves of said head member.

3. A drill bit including: a drill body head member having a plurality of longitudinally extending grooves in its lower exterior surface, each of said grooves having a locking lug recess extending inwardly of the body member intermediate the ends of said groove, each recess having an inwardly and downwardly inclined locking surface at its lower end; a detachable blade removably mounted in each of said grooves; an inwardly projecting downwardly extending locking lug member on the inner surface of each of said blades, said lug members being disposed in the recesses in the intermediate portions of said grooves of said head member with the lower surface of the lug member engaging the locking surface of the recess; a locking ring removably mounted on said head member and engaging the upper end of said blades; and a locking body collar member secured to said head member and holding said locking ring in engagement with said blades to prevent disengagement of the lugs of said blades from the recesses of the head member.

4. A drill bit including: a drill body head member having an axial bore therethrough and having an enlarged cylindrical lower portion and an upper reduced externally threaded portion; a plurality of circumferentially spaced longitudinally extending grooves in the exterior surface of the enlarged portion of said drill body head member, each of said grooves having a straight-walled portion defining one edge thereof extending longitudinally of said head member in a plane co-extensive with the longitudinal axis of said head member; each of said grooves in said body head member having a concave channel inwardly downwardly directed providing a continuation of said grooves in said head member and providing a downwardly facing thrust shoulder at the lower end of said groove, each of said grooves having a lug cavity formed intermediate the ends thereof and extending substantially radially inwardly of said enlarged portion of the body head member, each cavity having its lower wall extending inwardly and downwardly of said head member; a plurality of cutter blades detachably mounted on said drill head, each of said cutter blades having an inner edge portion conforming to the shape of and adapted to be mounted in one of said longitudinally extending grooves of said enlarged portion of said head member, said inner edge portion of each of said blades having an inwardly and downwardly inclined upwardly facing inwardly projecting shoulder portion engaging the concave inwardly and downwardly extending lower thrust portion of the groove, each of said cutting blades having an inwardly and downwardly extending lug projecting inwardly from the inner edge portion thereof intermediate the ends thereof and received in the lug cavity of the groove in which said blade is disposed, whereby the lug engages the inwardly and downwardly inclined upwardly facing surface at the lower end of the cavity and the inwardly and downwardly inclined shoulder of the inner edge portion of the blade engages the inwardly and downwardly extending thrust shoulder portion at the lower end of the groove of the head member, each of said cutter blades having an inwardly and upwardly extending shoulder at its upper end; and locking means mounted on said head member and engaging the inwardly and upwardly facing shoulder at the upper ends of each blade to wedge the blade downwardly and inwardly whereby the lug rides inwardly and downwardly on the lower surface of the lug cavity and the blade is held against upward movement on said head member.

5. A drill bit of the character set forth in claim 4 wherein: the locking means for locking and retaining the blades on the drill head member comprises a locking ring having an inwardly and upwardly undercut lower shoulder engageable with the upper ends of each of the drill blades for wedging the same inwardly and downwardly; and a drill body collar member threaded on to the upper end of the head member for securely holding the ring in locking and retaining engagement with the blade members.

6. A drill bit of the character set forth in claim 4 wherein: each of the blade members is identical in construction, whereby the blade members are readily interchangeable in the grooves of the head members.

7. A drill bit of the character set forth in claim 4 wherein each cutter blade member is provided with an upwardly extending lug means projecting upwardly above the upwardly and inwardly extending shoulder at the upper end of the blade, and wherein the means at the upper end of the head member for securing and locking the blade member in place on the head member comprises: a locking ring member slidably mounted on the reduced upper portion of the head member and having an internal annular undercut groove formed in the lower surface thereof for receiving the upwardly extending lugs of the blade members to hold the same in place against lateral displacement and to force the blades downwardly relative to the head member; and a body collar member threaded onto the head member for securing the locking ring member in place thereon.

8. A drill bit including: a drill body head member having a plurality of longitudinally extending circumferentially spaced grooves in its exterior surface, each of said grooves having a substantially radially extending locking recess formed in the head member intermediate the ends of said groove and extending inwardly of the head member from the bottom of the groove, each of said recesses having an inwardly and downwardly inclined locking surface at its lower end; a plurality of detachable drilling blade members each having an inner edge portion fitting the grooves of said head member and disposed in one of the grooves of said head member and having cutting edges at its lower end, each of said blade members having an inwardly and downwardly projecting lug formed on the inner edge thereof disposed within the locking recess intermediate the ends of said groove of said head member with the lower surface of said lug engaging the locking surface at the lower end of the locking recess in said groove; said head member being reduced in external diameter above said locking recess and below the upper end of said grooves, said blade members having their upper end portions reduced in external diameter and disposed in the portion of said grooves lying in the reduced portion of said body member; and a locking ring disposed on the reduced upper portion of said body member and slidable longitudinally thereon to engage the upper reduced end portions of said blade members to hold said blade members in the grooves of said head member with the lugs on said blade members engaged in the locking recesses in said grooves.

References Cited by the Examiner
UNITED STATES PATENTS

| | | | |
|---|---|---|---|
| 1,326,506 | 12/19 | Humason | 175—412 X |
| 2,498,251 | 2/50 | Creel | 175—412 |
| 2,599,854 | 6/52 | McMurdy et al. | 175—413 |
| 2,831,657 | 4/58 | Hawthorne | 175—412 |
| 2,978,049 | 4/61 | Skidmore et al. | 175—391 |
| 3,040,825 | 6/62 | Williams | 175—412 |

CHARLES E. O'CONNELL, *Primary Examiner.*